(12) United States Patent
Wilson et al.

(10) Patent No.: US 12,128,358 B2
(45) Date of Patent: Oct. 29, 2024

(54) METHODS OF TREATING FLUIDS USING THERMAL GRADIENT OSMOSIS

(71) Applicant: Battelle Energy Alliance, LLC, Idaho Falls, ID (US)

(72) Inventors: Aaron D. Wilson, Idaho Falls, ID (US); Christopher J. Orme, Firth, ID (US); John R. Klaehn, Idaho Falls, ID (US); Birendra Adhikari, Ammon, ID (US); Frederick F. Stewart, Idaho Falls, ID (US); Seth W. Snyder, Ammon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 490 days.

(21) Appl. No.: 17/009,360

(22) Filed: Sep. 1, 2020

(65) Prior Publication Data

US 2021/0060488 A1     Mar. 4, 2021

Related U.S. Application Data

(60) Provisional application No. 62/895,597, filed on Sep. 4, 2019.

(51) Int. Cl.
*B01D 53/22* (2006.01)
*B01D 61/00* (2006.01)
(Continued)

(52) U.S. Cl.
CPC ......... *B01D 61/005* (2013.01); *B01D 53/228* (2013.01); *B01D 61/002* (2013.01);
(Continued)

(58) Field of Classification Search
CPC   B01D 2313/22; B01D 2325/38; B01D 69/10; B01D 69/02; B01D 61/005; B01D 53/228; B01D 2325/36; C02F 1/445
See application file for complete search history.

(56) References Cited

U.S. PATENT DOCUMENTS

| 2,789,088 A | * | 4/1957 | Thomas | ............... B01D 17/005 210/176 |
| 4,645,602 A | * | 2/1987 | Barnes, Jr. | ............... B32B 27/12 427/245 |

(Continued)

OTHER PUBLICATIONS

Robinson "Water desalination using a temperature gradient" Desalination 464 (2019) 1-7 (Year: 2019).*

(Continued)

*Primary Examiner* — Anthony R Shumate
(74) *Attorney, Agent, or Firm* — TraskBritt

(57) ABSTRACT

A method of treating a fluid comprises introducing a feed fluid stream comprising multiple materials to first side of a semi-permeable membrane. A draw fluid stream having a higher temperature than the feed fluid stream is introduced to second, opposing side of the semi-permeable membrane to form a thermal gradient across the semi-permeable membrane. One or more of the multiple materials of the feed fluid stream is drawn through the semi-permeable membrane and into the draw fluid stream via thermal gradient osmosis. A fluid treatment system and a thermal gradient osmosis apparatus are also described.

19 Claims, 1 Drawing Sheet

(51) Int. Cl.
*B01D 69/02* (2006.01)
*B01D 69/10* (2006.01)
*B01D 69/12* (2006.01)
*C02F 1/44* (2023.01)

(52) U.S. Cl.
CPC .......... *B01D 69/02* (2013.01); *B01D 69/107* (2022.08); *B01D 69/1216* (2022.08); *C02F 1/445* (2013.01); *B01D 2311/103* (2013.01); *B01D 2313/221* (2022.08); *B01D 2313/903* (2022.08); *B01D 2325/36* (2013.01); *B01D 2325/38* (2013.01)

(56) References Cited

U.S. PATENT DOCUMENTS

| | | | | | |
|---|---|---|---|---|---|
| 5,145,583 | A * | 9/1992 | Angleraud | ............ | B01D 71/76 210/651 |
| 6,214,382 | B1 * | 4/2001 | Eguchi | ............ | B01D 67/0088 424/484 |
| 7,713,448 | B1 * | 5/2010 | Veedu | ............ | C01B 32/174 252/502 |
| 8,530,002 | B1 * | 9/2013 | Hibbs | ............ | C09D 5/1675 427/337 |
| 11,555,434 | B1 * | 1/2023 | Khaled | ............ | F28F 3/027 |
| 2004/0170110 | A1 * | 9/2004 | Yee | ............ | G11B 7/131 |
| 2005/0090018 | A1 * | 4/2005 | Walte | ............ | G01N 33/0014 422/83 |
| 2010/0018397 | A1 * | 1/2010 | Ishibe | ............ | B01D 63/14 96/9 |
| 2010/0024423 | A1 * | 2/2010 | McGinnis | ............ | F03G 7/04 60/649 |
| 2012/0208247 | A1 * | 8/2012 | Kipp | ............ | C10L 1/026 435/134 |
| 2012/0228222 | A1 * | 9/2012 | McGinnis | ............ | B01D 61/005 210/640 |
| 2016/0229714 | A1 * | 8/2016 | Thiel | ............ | C02F 1/048 |
| 2017/0246592 | A1 * | 8/2017 | Li | ............ | B82Y 30/00 |
| 2018/0079658 | A1 * | 3/2018 | Gershon | ............ | B01D 1/0035 |
| 2018/0100377 | A1 * | 4/2018 | Difoggio | ............ | F25B 23/006 |
| 2018/0369759 | A1 * | 12/2018 | Satyawali | ............ | C12P 13/001 |
| 2019/0162638 | A1 * | 5/2019 | Shea | ............ | B01D 69/10 |
| 2022/0072484 | A1 * | 3/2022 | Merz | ............ | C02F 1/441 |

OTHER PUBLICATIONS

International Products "An Easy Guide to Understanding How Surfactants Work", 5 pages, Jan. 12, 2022 https://www.ipcol.com/blog/an-easy-guide-to-understanding-surfactants/#:~:text=Surfactants%20have%20a%20hydrophobic%20(water,head%20is%20surrounded%20by%20water. (Year: 2022).*

Hartanto et al, "Thermoresponsive Acidic Microgels as Functional Draw Agents for Forward Osmosis Desalination" Environ. Sci. Technol. 2016, pp. 4221-4228.

Li et al. "Stimuli-Responsive Polymer Hydrogels as a New Class of Draw Agent for Forward Osmosis Desalination" Chem. Commun., 47, pp. 1710-1712.

Razmjou et al. "Bifunctional Polymer Hydrogel Layers as Forward Osmosis Draw Agents for Continuous Production of Fresh Water Using Solar Energy" Environ. Sci. Technol. 2013, 47, pp. 13160-13166.

Robinson et al., "Water Desalination Using a Temperature Gradient", Faculty of Engineering, University of Nottingham, 18 pages.

Rud et al., "Thermodynamic Model for a Reversible Desalination Cycle Using Weak Polyelectrolyte Hydrogels." Desalination 442 (2018): pp. 32-43.

* cited by examiner

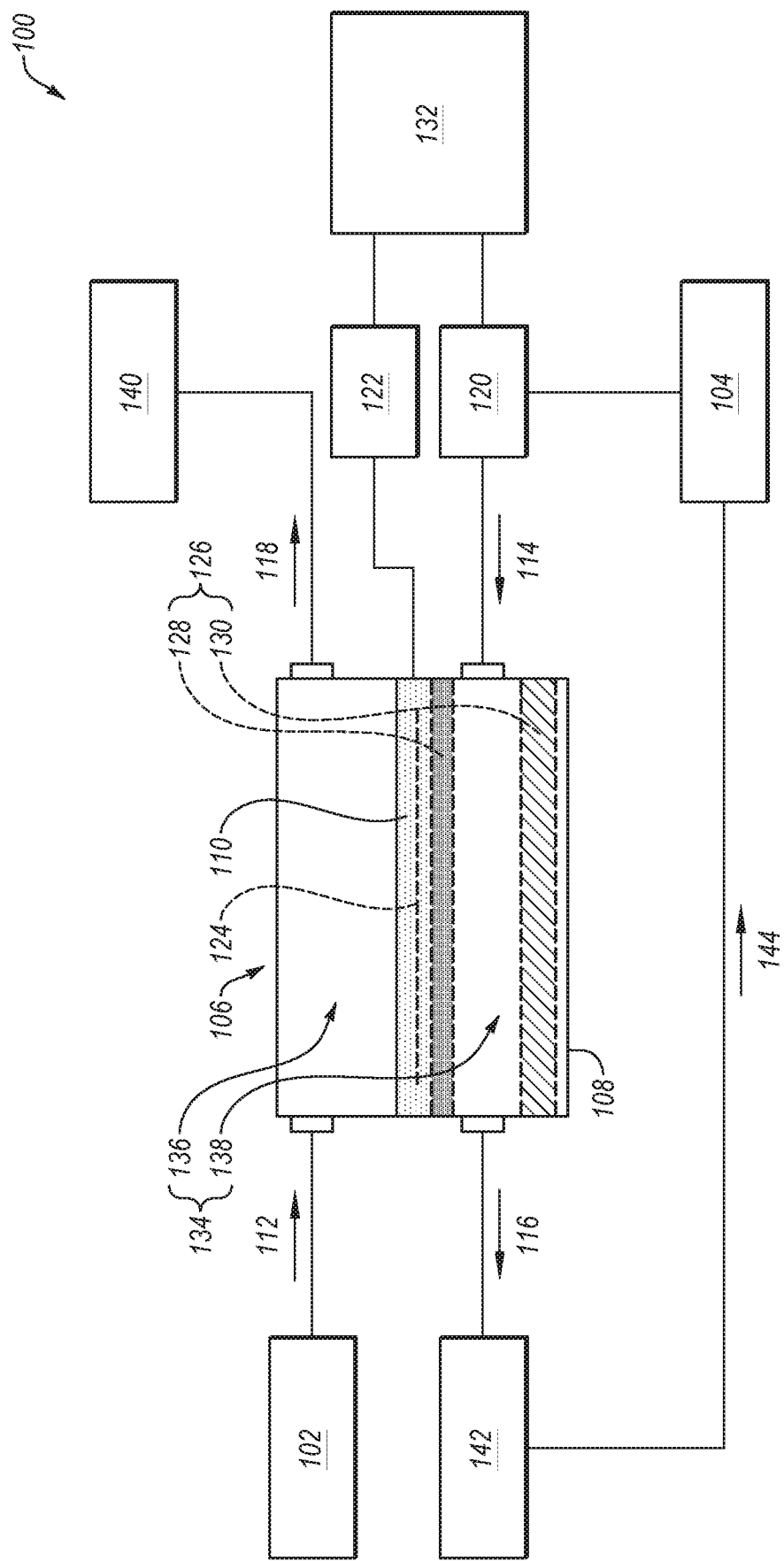

METHODS OF TREATING FLUIDS USING THERMAL GRADIENT OSMOSIS

CROSS-REFERENCE TO RELATED APPLICATION

This application claims the benefit under 35 U.S.C. § 119(e) of U.S. Provisional Patent Application Ser. No. 62/895,597, filed Sep. 4, 2019, the disclosure of which is hereby incorporated herein in its entirety by this reference.

STATEMENT REGARDING FEDERALLY SPONSORED RESEARCH OR DEVELOPMENT

This invention was made with government support under Contract Number DE AC07-05ID14517 awarded by the United States Department of Energy. The government has certain rights in the invention.

TECHNICAL FIELD

The disclosure, in various embodiments, relates to methods, systems, and apparatuses for the treating fluids using thermal gradient osmosis.

BACKGROUND

Various industries require energy efficient methods, systems, and apparatuses for treating a fluid (e.g., a liquid fluid, a gaseous fluid, a supercritical fluid) to remove one or more materials (e.g., liquid material(s), gaseous material(s)) of the fluid from one or more other materials (e.g., other liquid material(s), other gaseous material(s)) of the fluid.

Non-limiting examples of conventional methods for liquid fluid treatment (e.g., purification) include membrane filtration, thermal evaporation, cryogenic fractionation, distillation-based fractionation, pervaporation, vapor permeation, and similar separation methodologies. The most common membrane filtration method for removal of materials (e.g., solutes) from liquid fluids (e.g., solutions, such as aqueous solutions) is reverse osmosis (RO), in which a liquid material (e.g., liquid water, such as liquid water solvent) of a feed liquid (e.g., a feed solution) is separated from other materials (e.g., solutes, such as dissolved solids) of the feed liquid by application of a pressure overcoming the osmotic pressure of the feed liquid. However, the pressure to overcome the osmotic pressure of the feed liquid can be substantial (e.g., greater than 50 atmospheres (atm)), resulting in significant equipment and energy costs. In addition, the application of pressure often exacerbates RO membrane scaling and fouling by inorganic materials and organic materials.

It would be desirable to have new methods, systems, and apparatuses for treating a fluid, such as to selectively remove one or more materials of the fluid from one or more other materials of the fluid. It would further be desirable if the new methods, systems, and apparatuses facilitated enhanced energy and separation efficiency, and were relatively inexpensive and simple in operation.

BRIEF SUMMARY

Embodiments described herein include methods, systems, and apparatuses for treating a fluid using thermal gradient osmosis. In accordance with one embodiment described herein, a method of treating a fluid comprises introducing a feed fluid stream comprising multiple materials to first side of a semi-permeable membrane. A draw fluid stream having a higher temperature than a temperature of the feed fluid stream is introduced to second, opposing side of the semi-permeable membrane to form a thermal gradient across the semi-permeable membrane. One or more of the multiple materials of the feed fluid stream is drawn through the semi-permeable membrane and into the draw fluid stream via thermal gradient osmosis.

In further embodiments, a fluid treatment system comprises a feed fluid source, a draw fluid source, a heating apparatus, and a thermal gradient osmosis apparatus. The feed fluid source is configured to produce a feed fluid stream comprising multiple materials. The draw fluid source is configured to produce a draw fluid stream. The heating apparatus is configured and positioned to receive the draw fluid stream from the draw fluid source and to heat the draw fluid source to a temperature greater than a temperature of the feed fluid stream to form a heated draw fluid stream. The thermal gradient osmosis apparatus is downstream of the feed fluid source and the heating apparatus and comprises a housing structure and a thermal gradient osmosis membrane. The housing structure is configured and positioned to receive the feed fluid stream from the feed fluid source into a first region of an internal chamber thereof, and to receive the heated draw fluid stream from the heating apparatus into a second region of the internal chamber thereof. The thermal gradient osmosis membrane is positioned between the first region and the second region of the internal chamber of the housing structure, and has selective permeability to at least one of the multiple materials of the feed fluid stream through thermal gradient osmosis.

In additional embodiments, a thermal gradient osmosis apparatus comprises a housing structure and a thermal gradient osmosis membrane contained within the housing structure. The thermal gradient osmosis membrane comprises a hydrophilic support layer, and a hydrophilic selective layer on a first side of the hydrophilic support layer.

BRIEF DESCRIPTION OF THE DRAWINGS

FIG. 1 is a simplified schematic view of a fluid treatment system, in accordance with an embodiment of the disclosure.

DETAILED DESCRIPTION

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only and are not meant to be actual views of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "compatible" means that a material does not undesirably react, decompose, or absorb another material, and also that the material does not undesirably impair the chemical and/or mechanical properties of the another material.

As used herein, the terms "two-dimensional material" or "2D material" mean and include a material (e.g., a crystalline material, a non-crystalline material, a polymeric material) formed of and including a single (e.g., only one) monolayer, or at most two (2) monolayers or three (3) monolayers, of units (e.g., atoms, molecules) bonded together through intramolecular forces (e.g., covalent bonds). Stated another way, a 2D material may be characterized as a material (e.g., a crystalline material, a non-crystalline material, a polymeric material) comprising about three (3) or fewer monolayers bonded together though intramolecular forces.

An embodiment of the disclosure will now be described with reference to FIG. 1, which schematically illustrates a fluid treatment system 100. The fluid treatment system 100 may be used to separate one or more materials of a feed fluid from one or more other materials of the feed fluid using thermal gradient osmosis (TGO). The phenomenon of TGO has been examined and reported in Robinson et al., "Water Desalination Using a Temperature Gradient." *Desalination.* 464 (2019): 1-7. However, the techniques and assemblies described in Robinson are limited in scope and effectiveness and do not provide a comprehensive regime of efficient and diverse fluid treatment methods, systems, and apparatuses. By way of non-limiting example, Robinson fails to appreciate the use of hydrophilic membranes to facilitate significant transport of liquid water through a TGO membrane; and also fails to facilitate transport and purification of materials other than liquid water (e.g., organic liquids, non-aqueous, inorganic liquids, aqueous gases, organic gases, non-aqueous gas, inorganic gases, supercritical fluids). As shown in FIG. 1, the fluid treatment system 100 may include at least one feed fluid source 102, at least one draw fluid source 104, and at least TGO apparatus 106 in fluid communication with (e.g., downstream of) each of the feed fluid source 102 and draw fluid source 104. The TGO apparatus 106 includes a housing structure 108, and at least one TGO membrane 110 contained within the housing structure 108. TGO apparatus 106 may be configured and operated to receive at least one feed fluid stream 112 from the feed fluid source 102 on a first side of the TGO membrane 110 and at least one draw fluid stream 114 from the draw fluid source 104 on a second, opposing side of the TGO membrane 110, and to selectively draw one or more materials of the feed fluid stream 112 through TGO membrane 110 and into the draw fluid stream 114 using TGO to form a product stream 116 and a feed fluid remnants stream 118. The product stream 116 includes separated materials of the feed fluid stream 112 and materials of the draw fluid stream 114. The feed fluid remnants stream 118 includes remaining materials (e.g., materials not transferred to the draw fluid stream 114) of the feed fluid stream 112. The fluid treatment system 100 may further include one or more (e.g., each) of at least one heating apparatus 120 operatively associated with one or more of the draw fluid source 104, the TGO apparatus 106, and the draw fluid stream 114; at least one membrane heating device 122 operatively associated with the TGO membrane 110 of the TGO apparatus 106; at least one thermally reflective assembly 126 operatively associated with the TGO membrane 110 of the TGO apparatus 106; and at least one energy source 132 operatively associated with one or more of the TGO apparatus 106, the heating apparatus 120, and the membrane heating device 122. With the description provided below, it will be readily apparent to one of ordinary skill in the art that the methods, systems, and apparatuses described herein may be used in various systems. In other words, the methods, systems, and apparatuses of the disclosure may be used whenever it is desired to treat a fluid of interest.

With continued reference to FIG. 1, the feed fluid source 102 comprises at least one apparatus configured and operated to store and/or produce one or more fluids (e.g., a liquid fluid, such an aqueous liquid including liquid water ($H_2O$) and one or more other materials, and/or an organic liquid including a liquid hydrocarbon and one or more other materials; a gaseous fluid, such as an aqueous gas including $H_2O$ gas and one or more other materials, an organic gas including a hydrocarbon gas and one or more other materials, a non-aqueous, inorganic gas including a inorganic gas and one or more other materials). As a non-limiting example, the feed fluid source 102 may comprise a storage vessel (e.g., a tank) configured and operated to contain one or more of a liquid fluid and a gaseous fluid.

The feed fluid stream 112 may comprise one or more of an aqueous liquid; an organic liquid; a non-aqueous, inorganic liquid; an aqueous gas; an organic gas; a non-aqueous, inorganic gas; and a supercritical fluid. In some embodiments, the feed fluid stream 112 exhibits a single (e.g., only one) phase state (e.g., only one liquid phase, or only one gaseous phase). In additional embodiments, the feed fluid stream 112 exhibits multiple (e.g., more than one) phase states (e.g., multiple liquid phases, multiple gas phases, at least one liquid phase and at least one gaseous phase). Non-limiting examples of different material compositions of the feed fluid stream 112 are described in further detail below. The material composition of the feed fluid stream 112 affects the configuration of the TGO membrane 110 selected to treat (e.g., selectively separate materials of) the feed fluid stream 112 through TGO, as also described in further detail below.

In some embodiments, the feed fluid stream 112 comprises an aqueous solution. As used herein, the term "solution" means and includes a solution, a suspension, an emulsion, or a combination thereof. Since a person of ordinary skill in the art will recognize whether a particular reference describes a solution, a suspension, an emulsion, or a combination thereof from the context, for the purposes of readability and claiming the invention, the term "solution" means a solution, a suspension, an emulsion, or a combination thereof. The aqueous solution may include liquid $H_2O$ solvent and at least one solute. The solute may comprise one or more of at least one homogenous material and at least one heterogeneous material. Non-limiting examples of homogenous materials include inorganic materials (e.g., water soluble minerals; water soluble compounds, such as salts; radionuclides; scalants, such as calcium carbonate, calcium sulfate, barium sulfate, strontium sulfate, calcium fluoride, iron, colloidal materials, sodium metasilicate, sodium orthosilicate, sodium pyrosilicate, other sodium silicates, other water-soluble silicates), organic materials (e.g., hydrocarbon solids, hydrocarbon liquids, pharmaceuticals, plasticizers, phase modifiers, industrial chemicals, organics found in produced water), and inorganic/organic hybrid materials (e.g., coordination complexes (heme) and organometallic complexes, such as ferrocene). Non-limiting examples of heterogeneous materials include algae, microbes, small particulate matter, undissolved sewage material, nanoparticles, polymers, industrial muds, pumping fluids, and food product solution materials, such as fruit juices and milk solutions. The solute may be present as a contaminant or impurity of the liquid $H_2O$, or the liquid $H_2O$ may be present as a contaminant or impurity of the solute. By way of non-limiting example, the feed fluid stream 112 may comprise one or more of an aqueous saline solution, seawater, brine, brackish water, mineralized water, industrial waste water, produced water, mining waste (e.g., an aqueous potash solution, an aqueous gypsum solution, an aqueous lithium salt solution), a food product solution (e.g., an aqueous fruit juice solution, an aqueous milk solution), an aqueous acid solution, an aqueous base solution, an aqueous synthetic fermentation broth, an aqueous natural fermentation broth, an aqueous algal growth media, an aqueous microbial solution, an aqueous landfill leachate, an aqueous radioactive material solution (e.g., an aqueous solution including radionuclides), and an aqueous toxic material solution. In some embodiments, a total dissolved solids (TDS) content of the feed fluid stream 112 is greater than or equal to about 10 parts per million (ppm) (e.g., within a range of from about 10 ppm to about 35,000 ppm; from about 150 ppm to about 1,500 ppm; from about 35,000 ppm to about 75,000 ppm; greater than or equal to about 40,000 ppm). The fluid treatment system 100 may, for example, be employed to soften the feed fluid stream 112 by driving at least a portion (e.g., at least a majority, substantially all) of the solute(s) (e.g., scalant(s)) thereof out of solution, as described in further detail below.

In additional embodiments, the feed fluid stream 112 comprises an organic solution including an organic liquid solvent (e.g., a hydrocarbon liquid) and at least one solute. The solute may comprise one or more of at least one homogenous material and at least one heterogeneous material. The solute may be present as a contaminant or impurity of the organic liquid, or the organic liquid may be present as a contaminant or impurity of the solute. Components of the fluid treatment system 100 may, for example, be employed to isolate one or more organic liquid(s) (e.g., hydrocarbon liquids, halogenated organic liquids) present within the feed fluid stream 112 from one or more of additional organic liquid(s), $H_2O$ liquid, inorganic liquid(s), and other material(s) (e.g., organic solids, inorganic solids) present within the feed fluid stream 112.

In yet additional embodiments, the feed fluid stream 112 comprises an inorganic liquid solution including a non-aqueous, inorganic liquid solvent (e.g., liquid ammonia, liquid sulfur dioxide, liquid sulfuryl chloride, liquid sulfuryl chloride fluoride, liquid phosphoryl chloride, liquid dinitrogen tetroxide, liquid antimony trichloride, liquid bromine pentafluoride liquid hydrogen fluoride, liquid inorganic acids) and at least one solute. The solute may comprise one or more of at least one homogenous material and at least one heterogeneous material. The solute may be present as a contaminant or impurity of the non-aqueous, inorganic liquid; or the non-aqueous, inorganic liquid may be present as a contaminant or impurity of the solute. Components of the fluid treatment system 100 may, for example, be employed to isolate one or more non-aqueous, inorganic liquid(s) present within the feed fluid stream 112 from one or more of additional non-aqueous, inorganic liquid(s), liquid $H_2O$, organic liquid(s), and other material(s) (e.g., organic solids, inorganic solids) present within the feed fluid stream 112.

In further embodiments, the feed fluid stream 112 comprises a gaseous material including a mixture of two or more of $H_2O$ gas, at least one organic gas, at least one inorganic, non-aqueous gas, and at least one non-gaseous material (e.g., one or more of non-gaseous $H_2O$, at least one non-gaseous organic material, and at least one non-gaseous inorganic material). The non-gaseous material, if any, may be present in one or more of a solid phase state and a liquid phase state. In some embodiments, the non-gaseous material comprises one or more of solid particles and liquid droplets of suspended in one or more gases (e.g., $H_2O$ gas, organic gas(es), inorganic, non-aqueous gas(es)) of the feed fluid stream 112.

A single (e.g., only one) feed fluid stream 112 may exit the feed fluid source 102, or multiple (e.g., more than one) feed fluid streams 112 may exit the feed fluid source 102. If multiple feed fluid streams 112 exit the feed fluid source 102, each of the feed fluid streams 112 may exhibit substantially the same properties (e.g., substantially the same material composition, substantially the same temperature, substantially the same pressure, substantially the same flow rate, etc.), or at least one of the multiple feed fluid streams 112 may exhibit one or more different properties (e.g., a different material composition, a different temperature; a different pressure; a different flow rate; etc.) than at least one other of the multiple feed fluid streams 112.

With continued reference to FIG. 1, the draw fluid source 104 comprises at least one apparatus configured and operated to store and/or produce one or more fluids (e.g., a liquid fluid, such an aqueous liquid, an organic liquid, or a non-aqueous, inorganic liquid; a gaseous fluid, such as a gaseous material including one or more of $H_2O$ gas, at least one organic gas, and at least one inorganic, non-aqueous gas). As a non-limiting example, the draw fluid source 104 may comprise a storage vessel (e.g., a tank) configured and operated to contain one or more of a liquid fluid and a gaseous fluid.

The draw fluid stream 114 may comprise one or more of an aqueous liquid; an organic liquid; a non-aqueous, inorganic liquid; an aqueous gas; an organic gas; a non-aqueous, inorganic gas; and a supercritical fluid. A material composition of the draw fluid stream 114 may be selected to facilitate the separation of one or more material(s) of the feed fluid stream 112 from one or more other material(s) of the feed fluid stream 112 through TGO using the TGO apparatus 106. Accordingly, the material composition of the draw fluid stream 114 may at least partially depend on an overall material composition of the feed fluid stream 112, as well as on the properties of one or more material(s) desired to be selectively drawn (e.g., selectively separated) from one or more other material(s) of the feed fluid stream 112. The material composition of the draw fluid stream 114 may be substantially the same as a material composition of the material(s) desired to be selectively drawn from the feed fluid stream 112 through TGO or may be different than the material composition of the material(s) desired to be selectively drawn from the feed fluid stream 112 through TGO. If the material composition of the draw fluid stream 114 is different than that of the specific material(s) desired to be selectively drawn from the feed fluid stream 112 through TGO, the draw fluid stream 114 may be formulated such that the material(s) thereof may be easily separated from the material(s) of the feed fluid stream 112 selectively drawn into the draw fluid stream 114 using conventional processes (e.g., conventional material separation processes) and conventional processing equipment. Non-limiting examples of different material compositions of the draw fluid stream 114 are described in further detail below. In some embodiments, the draw fluid stream 114 exhibits a single (e.g., only one) phase state (e.g., only one liquid phase, or only one gaseous phase). In additional embodiments, the draw fluid stream 114 exhibits multiple (e.g., more than one) phase states (e.g., multiple liquid phases, multiple gas phases, at least one liquid phase and at least one gaseous phase).

In some embodiments, the draw fluid stream 114 comprises an aqueous liquid (e.g., liquid $H_2O$, an aqueous solution including liquid $H_2O$ solvent and at least one solute). As a non-limiting example, if the feed fluid stream 112 comprises an aqueous solution and it is desired to separate (e.g., selectively draw) liquid $H_2O$ solvent of the feed fluid stream 112 from one or more solute(s) of the feed fluid stream 112, the draw fluid stream 114 may comprise substantially pure liquid $H_2O$, or a solution including liquid $H_2O$ solvent and at least one solute. As another non-limiting example, if the feed fluid stream 112 comprises a solution (e.g., an organic solution, a non-aqueous, inorganic solution) including a liquid $H_2O$ solute and it is desired to separate the liquid $H_2O$ solute of the feed fluid stream 112 from a solvent (e.g., an organic solvent, a non-aqueous, inorganic solvent) of the feed fluid stream 112 and/or one or more other solute(s) (e.g., organic solute(s), inorganic solute(s)) of the feed fluid stream 112, the draw fluid stream 114 may comprise substantially pure liquid $H_2O$, or a solution including liquid $H_2O$ solvent and at least one solute. In some embodiments, the draw fluid stream 114 comprises substantially pure liquid $H_2O$.

In additional embodiments, the draw fluid stream 114 comprises an organic liquid (e.g., a single, substantially pure organic liquid; an organic solution including an organic liquid solvent and at least one solute). As a non-limiting example, if the feed fluid stream 112 comprises an organic solution and it is desired to separate (e.g., selectively draw) an organic liquid solvent of the feed fluid stream 112 from one or more solute(s) (e.g., organic solute(s), such as organic liquid solute(s) and/or organic solid solute(s); inorganic solute(s), such as inorganic liquid solute(s) and/or inorganic solid solute(s)) of the feed fluid stream 112, the draw fluid stream 114 may comprise a single, substantially pure organic liquid, or a solution including an organic liquid solvent and at least one solute. The organic liquid of the draw fluid stream 114 may have substantially the same material composition as the organic liquid solvent of the feed fluid stream 112 or may have a different material composition than the organic liquid solvent of the feed fluid stream 112. As another non-limiting example, if the feed fluid stream 112 comprises a solution (e.g., an organic solution; an aqueous solution; a non-aqueous, inorganic solution) and it is desired to selectively draw at least one solute (e.g., an organic solute, such as an organic liquid solute and/or an organic solid solute; an inorganic solute, such as a non-aqueous, inorganic liquid solute and/or a non-aqueous, inorganic solid solute) of the feed fluid stream 112 from a solvent (e.g., an organic liquid solvent, liquid $H_2O$ solvent, a non-aqueous inorganic liquid solvent) of the feed fluid stream 112, the draw fluid stream 114 may comprise a single, substantially pure organic liquid, or an organic solution including an organic liquid solvent and at least one solute. The organic liquid(s) of the draw fluid stream 114 may have substantially the same material composition as at least one desired solute of the feed fluid stream 112 or may have a different material composition than the desired solute(s) of the feed fluid stream 112. In some embodiments, the draw fluid stream 114 comprises at least one (e.g., only one, more than one) organic liquid having substantially the same material composition as at least one (e.g., only one, more than one) organic liquid desired to be selectively drawn from the feed fluid stream 112.

In yet additional embodiments, the draw fluid stream 114 comprises a non-aqueous, inorganic liquid (e.g., a single, substantially pure, non-aqueous inorganic liquid; a non-aqueous, inorganic solution including a non-aqueous, inorganic liquid solvent and at least one solute). As a non-limiting example, if the feed fluid stream 112 comprises a non-aqueous, inorganic solution and it is desired to separate (e.g., selectively draw) a non-aqueous, inorganic liquid solvent of the feed fluid stream 112 from one or more solute(s) (e.g., organic solute(s), such as organic liquid solute(s) and/or organic solid solute(s); inorganic solute(s), such as inorganic liquid solute(s) and/or inorganic solid solute(s)) of the feed fluid stream 112, the draw fluid stream 114 may comprise a single, substantially pure, non-aqueous inorganic liquid; or a solution including a non-aqueous, inorganic liquid solvent and at least one solute. The non-aqueous, inorganic liquid of the draw fluid stream 114 may have substantially the same material composition as the non-aqueous, inorganic liquid solvent of the feed fluid stream 112, or may have a different material composition than the non-aqueous, inorganic liquid solvent of the feed fluid stream 112. As another non-limiting example, if the feed fluid stream 112 comprises a solution (e.g., an organic solution, an aqueous solution, an non-aqueous, inorganic solution) and it is desired to selectively draw at least one solute (e.g., an organic solute, such as an organic liquid solute and/or an organic solid solute; an inorganic solute, such as a non-aqueous, inorganic liquid solute and/or a non-aqueous, inorganic solid solute) of the feed fluid stream 112 from a solvent (e.g., an organic liquid solvent; liquid $H_2O$ solvent; a non-aqueous, inorganic liquid solvent) of the feed fluid stream 112, the draw fluid stream 114 may comprise a single, substantially pure, non-aqueous inorganic liquid; or a solution including a non-aqueous, inorganic liquid solvent and at least one solute. The non-aqueous, inorganic liquid(s) of the draw fluid stream 114 may have substantially the same material composition as at least one desired solute of the feed fluid stream 112, or may have a different material composition than the desired solute(s) of the feed fluid stream 112. In some embodiments, the draw fluid stream 114 comprises at least one (e.g., only one, more than one) non-aqueous, inorganic liquid having substantially the same material composition as at least one (e.g., only one, more than one) non-aqueous, inorganic liquid desired to be selectively drawn from the feed fluid stream 112.

In further embodiments, the draw fluid stream 114 comprises a gaseous material including one or more of $H_2O$ gas; at least one organic gas; and at least one non-aqueous, inorganic gas. As a non-limiting example, if the feed fluid stream 112 comprises an aqueous gas and it is desired to separate (e.g., selectively draw) $H_2O$ gas of the feed fluid stream 112 from one or more other material(s) (e.g., other gas(es), suspended liquids, suspended solids) of the feed fluid stream 112, the draw fluid stream 114 may comprise substantially pure $H_2O$ gas, or a mixture of $H_2O$ gas and at least one other material. As another non-limiting example, if the feed fluid stream 112 comprises an organic gas and it is desired to separate (e.g., selectively draw) the organic gas of the feed fluid stream 112 from one or more other material(s) (e.g., other gas(es), suspended liquids, suspended solids) of the feed fluid stream 112, the draw fluid stream 114 may comprise a single, substantially pure organic gas, or a mixture of an organic gas and at least one other material (e.g., another gas, such as another organic gas; suspended liquids; suspended solids). As an additional non-limiting example, if the feed fluid stream 112 comprises a non-aqueous, inorganic gas and it is desired to separate (e.g., selectively draw) the non-aqueous, inorganic gas of the feed fluid stream 112 from one or more other material(s) (e.g., other gas(es), suspended liquids, suspended solids) of the feed fluid stream 112, the draw fluid stream 114 may comprise a single, substantially pure, non-aqueous inorganic gas, or a mixture of a non-aqueous inorganic gas and at least one other material (e.g., another gas, such as another non-aqueous inorganic gas; suspended liquids; suspended solids).

A single (e.g., only one) draw fluid stream 114 may exit the draw fluid source 104, or multiple (e.g., more than one) draw fluid streams 114 may exit the draw fluid source 104. If draw fluid streams 114 exit the draw fluid source 104, each of the draw fluid streams 114 may exhibit substantially the same properties (e.g., substantially the same material composition, substantially the same temperature, substantially the same pressure, substantially the same flow rate, etc.), or at least one of the multiple draw fluid streams 114 may exhibit one or more different properties (e.g., a different material composition, a different temperature; a different pressure; a different flow rate; etc.) than at least one other of the draw fluid streams 114.

A temperature of the draw fluid stream 114 may be selected relative to a temperature of the feed fluid stream 112, material compositions of the feed fluid stream 112 and the draw fluid stream 114, and a configuration of the TGO apparatus 106 (e.g., including components, component sizes, component shapes, component material compositions, and component arrangements of the TGO apparatus 106) to selectively drive one or more material(s) of the feed fluid stream 112 from the feed fluid stream 112 and into the draw fluid stream 114 by way of TGO. The temperature of the draw fluid stream 114 may be controlled to be greater (e.g., warmer, hotter) than that of the feed fluid stream 112 to facilitate a thermal gradient across the TGO membrane 110 that, in conjunction with other properties of the TGO membrane 110, effectuates selective transfer of the material(s) from the feed fluid stream 112 and into the draw fluid stream 114 to form the product stream 116. The temperature of the draw fluid stream 114 may, for example, be controlled to be greater than or equal to about one (1) degree Celsius (° C.) warmer than a temperature the feed fluid stream 112, such as within a range of from about 1° C. to about 50° C. greater than the temperature of the feed fluid stream 112. Material flux from the feed fluid stream 112 to the draw fluid stream 114 may be maximized by the thermal gradient across the TGO membrane 110. The relatively greater temperature of the draw fluid stream 114 provides the draw fluid stream 114 a lower chemical potential than the feed fluid stream 112. The feed fluid stream 112 and the draw fluid stream 114 may each individually exhibit a substantially constant (e.g., substantially invariable, substantially unchanging) temperature over the period of time that the feed fluid stream 112 and the draw fluid stream 114 are directed into the TGO apparatus 106, or one or more of the feed fluid stream 112 and the draw fluid stream 114 may exhibit variable (e.g., non-constant, changing) temperatures over the period of time the feed fluid stream 112 and the draw fluid stream 114 are directed into the TGO apparatus 106. In some embodiments, the feed fluid stream 112 is left at ambient temperature, is heated, or is cooled (e.g., cryogenically cooled); and the temperature of the draw fluid stream 114 is controlled to be greater than the temperature of the feed fluid stream 112.

The feed fluid stream 112 and the draw fluid stream 114 may each individually exhibit any pressure(s) permitting the selective transfer of one or more materials of the feed fluid stream 112 into the draw fluid stream 114 within the TGO apparatus 106 by way of TGO. Since TGO is not as pressure reliant as many conventional osmotic separation processes, such as reverse osmosis (RO) wherein pressure applied to a feed stream to be treated needs to be greater than the osmotic pressure of the feed stream, the pressure of the feed fluid stream 112 may be relatively low. The relatively low operational pressure of the feed fluid stream 112 may facilitate configurations of the TGO membrane 110 that may be infeasible to use in conventional osmotic separation processes (e.g., conventional RO processes), as described in further detail below. The feed fluid stream 112 and the draw fluid stream 114 may each individually exhibit a substantially constant (e.g., substantially invariable, substantially unchanging) pressure over the period of time the feed fluid stream 112 and the draw fluid stream 114 are directed into the TGO apparatus 106, or one or more of the feed fluid stream 112 and the draw fluid stream 114 may exhibit variable (e.g., non-constant, changing) pressures over the period of time the feed fluid stream 112 and the draw fluid stream 114 are directed into the TGO apparatus 106.

The flow rate(s) of the feed fluid stream 112 and the draw fluid stream 114 may be individually be selected relative to one another; material compositions and temperatures of the feed fluid stream 112 and the draw fluid stream 114; and a configuration of the TGO apparatus 106 (e.g., including components, component sizes, component shapes, component material compositions, and component arrangements of the TGO apparatus 106) to control residence time within the $CO_2$ capture TGO apparatus 106 as well as amount(s) (e.g., concentration(s)) of material(s) drawn from the feed fluid stream 112 within the product stream 116. The feed fluid stream 112 and the draw fluid stream 114 may each individually exhibit a substantially constant (e.g., substantially invariable, substantially unchanging) flow rate over the period of time the feed fluid stream 112 and the draw fluid stream 114 are directed into the TGO apparatus 106, or one or more of the feed fluid stream 112 and the draw fluid stream 114 may exhibit variable (e.g., non-constant, changing) flow rates over the period of time the feed fluid stream 112 and the draw fluid stream 114 are directed into the TGO apparatus 106.

The heating apparatus 120, if present, may comprise at least one apparatus (e.g., one or more of a heat exchanger, such as a tube-in-tube heat exchanger and/or a shell-and-tube heat exchanger; a combustion heater; a nuclear heater; a sonication heater; an electrical resistance heater; an inductive heater; an electromagnetic heater, such as an infrared heater and/or a microwave heater) configured and operated to heat one or more of at least a portion of the draw fluid source 104, the draw fluid stream 114, and one or more portion(s) of the TGO apparatus 106. The heating apparatus 120 may be employed to impart the draw fluid stream 114 with a greater temperature than the feed fluid stream 112 to facilitate a thermal gradient between one side (e.g., a draw fluid side) of the TGO membrane 110 and another side (e.g., a feed fluid side) of the TGO membrane 110 during use and operation of the fluid treatment system 100. The heating apparatus 120 may, for example, heat the draw fluid stream 114 to a temperature greater than or equal to about 1° C. warmer than a temperature the feed fluid stream 112, such as within a range of from about 1° C. to about 50° C. greater than the temperature of the feed fluid stream 112. In some embodiments, the heating apparatus 120 heats the draw fluid stream 114 to a temperature greater than a temperature of the feed fluid stream 112 before the draw fluid stream 114 is directed into the TGO apparatus 106. The heating apparatus 120 may, for example, be operatively coupled to (e.g., thermally coupled to) one or more of the draw fluid source 104 and one or more lines (e.g., pipes, tubes) fluidly connecting the draw fluid source 104 and the TGO apparatus 106. In additional embodiments, the heating apparatus 120 heats the draw fluid stream 114 to a temperature greater than a temperature of the feed fluid stream 112 after the draw fluid stream 114 is directed into the TGO apparatus 106. The heating apparatus 120 may, for example, be operatively coupled to (e.g., thermally coupled to) one or more portion(s) of the TGO apparatus 106 receiving and interacting with the draw fluid stream 114. In further embodiments, such as embodiments wherein other components (e.g., the membrane heating device 122) and processes are employed to effectuate a thermal gradient across the TGO membrane 110 (as described in further detail below), the heating apparatus 120 may be omitted (e.g., absent) from the fluid treatment system 100.

Energy (e.g., thermal energy, electricity) used by the heating apparatus 120 (if any) (e.g., to heat one or more of the draw fluid source 104, the draw fluid stream 114, and one or more portion(s) of the TGO apparatus 106) may be supplied by the energy source 132. The energy source 132 may, for example, comprise one or more of a device, structure, or apparatus configured and operated to exploit one or more of solar thermal energy (e.g., a solar pond; a concentrated solar power apparatus, such as one or more of parabolic tough, a solar power tower, an enclosed tough, a Fresnel reflector, a dish Stirling; etc.), wind (e.g., wind turbine) energy, hydropower energy, geothermal energy, nuclear energy, fuel cell energy, combustion-based energy (e.g., energy obtained through the combustion of one or more of hydrogen and at least one hydrocarbon material, such as one or more of coal, natural gas, freedom gas, oil, and biomass), and waste heat (e.g., heat generated from one or more of an engine, a chemical process, and a phase change process). The energy source 132 may be used to supply energy to one or more other component(s) (e.g., pumps, compressors, other heating devices, cooling devices, detectors, sensors, regulators, other devices, other structures, other apparatuses) of the fluid treatment system 100 in addition to (or in place of) the heating apparatus 120.

With continued reference to FIG. 1, the TGO apparatus 106, including the housing structure 108 and the TGO membrane 110 thereof, is configured and operated to establish and utilize a thermal gradient extending through the TGO membrane 110 thereof to facilitate the selective transfer of one or more material(s) of the feed fluid stream 112 into the draw fluid stream 114 to form the product stream 116 and the feed fluid remnants stream 118. The housing structure 108 of the TGO apparatus 106 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the TGO membrane 110 therein, to receive and direct the feed fluid stream 112 to a first side of the TGO membrane 110, to receive and direct the draw fluid stream 114 to a second, opposing side of the TGO membrane 110, and to direct the product stream 116 and the feed fluid remnants stream 118 away from the TGO apparatus 106. The housing structure 108 may be formed of and include any material (e.g., glass, metal, alloy, polymer, ceramic, composite, combinations thereof, etc.) compatible with the operating conditions (e.g., temperatures, pressures, material interactions) of the TGO apparatus 106.

As shown in FIG. 1, the housing structure 108 of the TGO apparatus 106 may at least partially define at least one internal chamber 134 (e.g., at least one internal open volume, at least one internal cavity) at least partially (e.g., substantially) surrounding the TGO membrane 110. The TGO membrane 110 may serve as a boundary between at least one first region 136 (e.g., at least one feed fluid region) of the internal chamber 134 configured and positioned to receive the feed fluid stream 112 and to direct the feed fluid remnants stream 118 from the TGO apparatus 106, and at least one second region 138 (e.g., at least one draw fluid region) of the internal chamber 134 configured and positioned receive the draw fluid stream 114 and to direct the product stream 116 from the TGO apparatus 106. The feed fluid stream 112 and the draw fluid stream 114 may be flowed through the TGO apparatus 106 (e.g., the internal chamber 134 of the TGO apparatus 106) in the same direction as one another (e.g., concurrent flow), or in opposite directions than one another (e.g., countercurrent flow). As shown in FIG. 1, in some embodiments, the feed fluid stream 112 and the draw fluid stream 114 are flowed through the TGO apparatus 106 in opposite directions than one another.

The TGO membrane 110 may be coupled to or integral with the housing structure 108. Optionally, at least one additional structure may be configured and positioned to support (e.g., maintain the position of) the TGO membrane 110 within the housing structure 108. The TGO membrane 110 may exhibit any desired position and any desired orientation within the housing structure 108. By way of non-limiting example, as shown in FIG. 1, the TGO membrane 110 may be positioned centrally about and extend parallel to a horizontal axis of the housing structure 108. In additional embodiments, the TGO membrane 110 may exhibit one or more of a different position and a different orientation within the housing structure 108. By way of non-limiting example, the TGO membrane 110 may be positioned more distal from (e.g., offset from) the horizontal axis of the housing structure 108, and/or may extend non-parallel (e.g., perpendicular to, diagonal to, etc.) to the horizontal axis of the housing structure 108.

The TGO membrane 110 is configured to have selective permeability to one or more predetermined materials of the feed fluid stream 112 when a thermal gradient is applied across the TGO membrane 110 (e.g., by imparting the draw fluid stream 114 with a relatively greater temperature than the feed fluid stream 112). The TGO membrane 110 may have properties (e.g., dimensions, shapes, material compositions, material distributions, material selectivities, porosities) promoting the migration of the predetermined material(s) of the feed fluid stream 112 therethrough and into the draw fluid stream 114 through TGO, while impeding (e.g., substantially preventing) the migration of other material(s) of the feed fluid stream 112 and material(s) of the draw fluid stream 114 therethrough. The TGO membrane 110 may effectuate the migration of the predetermined material(s) of the feed fluid stream 112 therethrough and into the draw fluid stream 114 without a change in the phase state of the predetermined material(s). As described in further detail below, the configuration of TGO membrane 110 at least partially depends on the material composition of the feed fluid stream 112 and the properties of the material(s) of the feed fluid stream 112 desired to be selectively removed from the other material(s) of the feed fluid stream 112.

The TGO membrane 110 may exhibit any dimensions and any shape(s) facilitating the selective migration of one or more materials of the feed fluid stream 112 into the draw fluid stream 114. The dimensions and the shape(s) of the TGO membrane 110 may be selected relative the dimensions and the shape(s) of the housing structure 108 such that the TGO membrane 110 is substantially contained within boundaries of the housing structure 108, and such that the TGO membrane 110 at least partially (e.g., substantially, completely) intervenes between different regions (e.g., the first region 136 and the second region 138) of the internal chamber 134 of the TGO membrane 110. By way of non-limiting example, the TGO membrane 110 may at least partially (e.g., substantially) extend (e.g., horizontally extend, vertically extend) between opposing surfaces (e.g., horizontal surfaces, vertical surfaces) of the housing structure 108, and may exhibit one or more of a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape. As shown in FIG. 1, in some embodiments, the TGO membrane 110 exhibits a substantially flat sheet shape (e.g., a plate shape) extending from a first end of the housing structure 108 to a second, opposing end of the housing structure 108. In such embodiments, the first region 136 of the internal chamber 134 of the TGO membrane 110 may be positioned adjacent a first external surface of the TGO membrane 110, and the second region 138 of the internal chamber 134 of the TGO membrane 110 may be positioned adjacent a second, opposing external surface of the TGO membrane 110, or vice versa. In additional embodiments, the TGO membrane 110 exhibits a different shape, such as a hollow fiber shape; a tubular shape (e.g., a linear tubular shape; a non-linear tubular shape, such an angled tubular shape, a curved tubular shape); a spiraled shape (e.g., a spiral wound shape), and a honeycomb shape. In such embodiments, the first region 136 of the internal chamber 134 of the TGO membrane 110 may be positioned adjacent a relatively more external surface of the TGO membrane 110, and the second region 138 of the internal chamber 134 of the TGO membrane 110 may be positioned adjacent a relatively more internal surface of the TGO membrane 110, or vice versa.

The TGO membrane 110 is formed of and includes one or more material(s) compatible with the materials of the feed fluid stream 112 and the draw fluid stream 114 and selectivity permeable to one or more material(s) desired to be transferred from the feed fluid stream 112 and into the draw fluid stream 114. By way of non-limiting example, depending on properties of the feed fluid stream 112, the draw fluid stream 114, and the material(s) desired to be selectively removed from the feed fluid stream 112; the TGO membrane 110 may be formed of and include one or more of a polymer (e.g., a polyolefin, such as a polyethylene (PE), a polypropylene (PP); etc.; a polyamide (PA); a polyimide (PI); a polyphosphazene; a polysulfone; a fluorinated polymer, such as poly(terafluoroethylene) (PTFE), poly(vinylidene fluoride) (PVDF), etc.; a poly(ether ketone) (PEK); a poly (ether ether ketone) (PEEK); a poly(ether sulfone) (PES); a polydimethylsiloxane (PDMS); a silicone polymer; a cellulose acetate; etc.), a polymeric composite material, a metal, a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), a ceramic (e.g., metal carbides, metal nitrides, metal oxides, metal borides, etc.), a ceramic-metal composite material, a two-dimensional material (e.g., a transition metal dichalcogenide (TMDC) having a chemical formula of $MX_2$, where M is a transition metal and X is a chalcogen such as sulfur (S), selenium (Se), or tellurium (Te); graphene; graphene oxide; stanene; phosphorene; hexagonal boron nitride (h-BN); borophene; silicone; graphyne; germanene; germanan; a 2D supracrystal; etc.), or combinations thereof.

The TGO membrane 110 may be substantially homogeneous or may be substantially heterogeneous. As used herein, the term "homogeneous" means amounts of one or more materials do not vary throughout different portions (e.g., different horizontal and vertical portions) of a structure. Conversely, as used herein, the term "heterogeneous" means amounts of one or more materials vary throughout different portions of a structure. Amounts of the material(s) may vary stepwise (e.g., change abruptly), or may vary continuously (e.g., change progressively, such as linearly, parabolically) throughout different portions of the structure. In some embodiments, the TGO membrane 110 is substantially homogeneous. In additional embodiments, the TGO membrane 110 is heterogeneous. The TGO membrane 110 may, for example, be formed of and include a stack of at least two (2) different materials.

The material(s) of the TGO membrane 110 may be formulated to have desired affinities and/or aversions for different materials of the feed fluid stream 112. The TGO membrane 110 may, for example, be formed or selected in view of the characteristics of the material(s) sought to be separated from the feed fluid stream 112 to be hydrophilic, hydrophobic, amphiphilic, organophilic, oxophilic, lipophilic, or oleophilic. As a non-limiting example, if it is desired to selectively transfer $H_2O$ (e.g., liquid $H_2O$, such as liquid $H_2O$ solvent or a liquid $H_2O$ solute; $H_2O$ gas) from the feed fluid stream 112 into the draw fluid stream 114, the TGO membrane 110 may be formed or selected to be hydrophilic. As used herein, the term "hydrophilic" means and includes any material or surface with which water droplets have a contact angle in air less than 90°, as measured by a contact angle goniometer as described in ASTM Standard D7334-08 (*Standard Practice for Surface Wettability of Coatings, Substrates and Pigments by Advancing Contact Angle Measurement*, ASTM Intl, West Conshohocken, Pa., 2008), which standard is incorporated herein in its entirety by this reference. The TGO membrane 110 may, for example, have a contact angle with water droplets in air that is less than or equal to 85°, such as less than or equal to 60°, less than or equal to 45°, less than or equal to 30°, less than or equal to 15°, or less than or equal to 5°. As another non-limiting example, if it is desired to selectively transfer at least one organic material (e.g., an organic liquid, such as an organic liquid solvent and/or an organic liquid solute; an organic gas) from the feed fluid stream 112 into the draw fluid stream 114, the TGO membrane 110 may be formed or selected to be hydrophobic. As used herein, the term "hydrophobic" means and includes any material or surface with which water droplets have a contact angle in air of at least 90°, as measured by a contact angle goniometer as described in ASTM Standard D7334-08. The TGO membrane 110 may, for example, have a contact angle with water droplets in air that is greater than or equal to 95°, such as greater than or equal to 110°, greater than or equal to 125°, greater than or equal to 140°, or greater than or equal to 150°. As another non-limiting example, if it is desired to selectively transfer at least one non-aqueous, inorganic material (e.g., a non-aqueous, inorganic liquid, such as a non-aqueous, inorganic liquid solvent and/or non-aqueous, inorganic liquid solute; a non-aqueous, inorganic gas) from the feed fluid stream 112 into the draw fluid stream 114, the TGO membrane 110 may be formed or selected to have neutral selectively to water (e.g., to be neither hydrophilic nor hydrophobic).

Functional groups (e.g., hydrophilic functional groups, hydrophobic functional groups, amphiphilic functional groups, organophilic functional groups, oxophilic functional groups, lipophilic functional groups, oleophilic functional groups) of the TGO membrane 110 imparting the TGO membrane 110 with desired material selectivity may serve as chemical binding locations for the material(s) of the feed fluid stream 112 being selectively transferred to the draw fluid stream 114. The functional groups of the TGO membrane 110 may adsorb the material(s) out of the feed fluid stream 112 to lower chemical potential within the TGO membrane 110 established by the thermal gradient across the TGO membrane 110, and then the material(s) may traverse the TGO membrane 110 by way of progressively lower chemical potentials facilitated by the thermal gradient across the TGO membrane 110. The material(s) may desorb from functional groups relatively more distal from the draw fluid stream 114 and then adsorb to additional functional groups positioned progressively closer to the draw fluid stream 114 until the material(s) reach and are received by the draw fluid stream 114. A phase state (e.g., liquid phase state, gaseous phase state) of the material(s) may be maintained (e.g., may not change) as the material(s) enter into, travel across, and exit the TGO membrane 110.

Non-limiting examples of suitable functional groups to impart the TGO membrane 110 with desired affinities and/or aversions for different materials include acid groups; hydroxy groups; carboxy groups; glycol groups; ionic groups; epoxy groups; ether groups; ketone groups; amine groups; ammonium groups; tosyl groups; tiflate group; bis-triflimide groups; sulphonate groups; phosphonium groups; imidazole groups; pyridinium groups; pyrrolidinium groups; alkoxy groups; alkyl groups, such as methyl, ethyl, propyl, butyl, pentyl, hexyl, octyl, dodecyl, and/or octadecyl groups; aryl groups, such as phenyl, and/or hydroxyphenyl groups; aralkyl groups; alkaryl groups, such as benzyl groups attached via the aryl portion (e.g., 4-methylphenyl, 4-hydroxymethylphenyl, or 4-(2-hydroxyethyl)phenyl, and/or aralkyl groups attached at the benzylic (alkyl) position, such as in a phenylmethyl and 4-hydroxyphenylmethyl groups, and/or attached at the 2-position, such as in a phenethyl and 4-hydroxyphenethyl groups); lactone groups; functionalized polymeric groups, such as acrylic chains having carboxylic acid groups, hydroxyl groups, and/or amine groups; functionalized oligomeric groups; organic cation groups; organic anion groups; and/or combinations thereof.

In some embodiments, the material(s) of the TGO membrane 110 may be functionalized to exhibit desired affinities and/or aversions for different material(s) of the feed fluid stream 112. For example, desirable functional groups (e.g., hydrophilic functional groups; hydrophobic functional groups, amphiphilic functional groups, organophilic functional groups, oxophilic functional groups, lipophilic functional groups, oleophilic functional groups) may be attached to the material(s) directly, and/or through intermediate functional groups (e.g., carboxy groups, amino groups, etc.) by way of one or more conventional reaction mechanisms (e.g., amination, nucleophilic substitution, oxidation, Stills; coupling, Suzuki coupling, Sharpless coupling (click-chemistry), disulfide coupling, diazo coupling, organometallic coupling, etc.). In additional embodiments, the material(s) of the TGO membrane 110 is/are formulated to exhibit desired affinities and/or aversions for different material(s) of the feed fluid stream 112 without having to perform additional processing acts to attach functional groups thereto. For example, the material(s) of the TGO membrane 110 may already exhibit desired affinities and/or aversions for different material(s) of the feed fluid stream 112 without having to perform additional functionalization acts.

The TGO membrane 110 may exhibit a porosity that, in combination with the affinities and/or aversions of the TGO membrane 110 (e.g., as imparted by the function groups of the material(s) of the TGO membrane 110) and the properties (e.g., material compositions, temperatures, pressures, flow rates) of the feed fluid stream 112 and the draw fluid stream 114, facilitates the selective migration of one or more predetermine material(s) of the feed fluid stream 112 into the draw fluid stream 114 to form the product stream 116. Pores (e.g., apertures, openings, etc.) of the TGO membrane 110 may extend in tortuous (e.g., twisting, winding, etc.) paths throughout a thickness of the TGO membrane 110, and/or may extend in substantially linear paths throughout a thickness of the TGO membrane 110. In some embodiments, the pores of the TGO membrane 110 are sized to permit the predetermine material(s) of the feed fluid stream 112 to traverse the TGO membrane 110 while excluding other material(s) of the feed fluid stream 112 from migrating therethrough. In additional embodiments, the TGO membrane 110 is formed or selected to have properties promoting selective migration of one or more material(s) of the feed fluid stream 112 through one or more other separation mechanisms (e.g., separation mechanisms in addition to or instead of size exclusion), such as one or more separation mechanism(s) based on one or more of physical interactions, electrostatic interactions, magnetic interactions, pressure, and chemical activity within the TGO membrane 110. In some embodiments, TGO facilitated by the TGO apparatus 106 (including the TGO membrane 110) supplement one or more other separation drive force(s), such as one or more of physical driving force, electrostatic driving force, magnetic drive force, pressure drive force (e.g., positive pressure driving force, negative pressure driving force), and chemical activity driving force.

As previously mentioned, the configuration (e.g., dimensions, shape(s), material composition, material distribution, material selectivity, porosity) of the TGO membrane 110 may depend on (e.g., may be tailored to) the properties e.g., material composition, phase state) of the feed fluid stream 112 to be treated using the TGO apparatus 106. Non-limiting examples of different configurations of the TGO membrane 110 for different feed fluid streams 112 are provided below.

In some embodiments wherein the feed fluid stream 112 comprises an aqueous solution, the TGO membrane 110 is configured to facilitate the selective removal of liquid $H_2O$ solvent of the aqueous solution through TGO. In such embodiments, the TGO membrane 110 may be formed of and include one or more material(s) having affinity to the liquid $H_2O$ solvent, such as one or more hydrophilic material(s). For example, the TGO membrane 110 may comprise a multilayer structure including a hydrophilic support layer and a hydrophilic selective layer on the hydrophilic support layer. In some such embodiments, the TGO membrane 110 comprises a conventional reverse osmosis (RO) membrane imparted with hydrophilic functionalities (e.g., hydrophilic functional groups, such as one or more of hydroxyl groups, carboxyl groups, tosyl groups, triflate groups, bistriflimide groups, sulphonate groups, amine groups, ammonium groups, phosphonium groups, mineral groups, imidazole groups, pyridinium groups, pyrrolidinium groups, organic cation groups, organic anion groups) in the selective layer and the support layer thereof. For example, the TGO membrane 110 may include an interfacially-polymerized polyamide selective layer, a phase-inverted polysulfone support layer functionalize with hydrophilic groups, and, optionally, a backing (e.g., a non-woven backing). It was unexpectedly found that employing a hydrophilic support layer facilitates substantially greater liquid $H_2O$ flux and effectively dewaters aqueous solutions exhibiting relatively greater solute concentrations (e.g., dissolved solids concentrations) than support layers that are hydrophilically and hydrophobically neutral. In additional embodiments, the TGO membrane 110 comprises a multi-layer structure including a hydrophilic support layer and a hydrophilic, 2D material (as a hydrophilic selective layer) on the hydrophilic support layer. 2D materials are conventionally infeasible to employ in RO membranes due to the incompatibly high pressures used in RO processes. However, as such high pressures are not necessary to facilitate selective material separation through TGO, 2D materials may be employed by the TGO membrane 110 for liquid $H_2O$ separations. Employing a hydrophilic, 2D material as a selective layer for the TGO membrane 110 may increase the efficacy of TGO-based dewatering operations (e.g., relative to the material compositions of at least some selective layers of conventional RO membranes) by separating thermal transfer from mass transfer. In further embodiments, the TGO membrane 110 comprises a conventional forward osmosis (FO) including hydrophilic functionalities. Hydrophilic functional groups of the TGO membrane 110 may serve as sites for adsorption and desorption (e.g., thermal desorption, thermal stripping) of the liquid $H_2O$ within and across the TGO membrane 110 facilitated by progressively lower chemical potentials resulting from a thermal gradient established across the TGO membrane 110. The liquid $H_2O$ solvent of the feed fluid stream 112 may remain in a liquid phase as it enters into, migrates across, and exits the TGO membrane 110 using TGO.

In some additional embodiments wherein the feed fluid stream 112 comprises a solution (e.g., an organic solution) including one or more organic liquid(s) (e.g., an organic liquid solvent, at least one organic liquid solute), the TGO membrane 110 is configured to facilitate the selective removal at least one organic liquid (e.g., an organic liquid solvent, at least one organic liquid solute) of the solution through TGO. In such embodiments, the TGO membrane 110 may be formed of and include material having affinity to the organic liquid(s) (e.g., one or more hydrophobic material(s)), and/or an aversion to other material(s) (e.g., other liquid(s), dissolved solid(s)) of the feed fluid stream 112. For example, the TGO membrane 110 may be formed of and include one or more adsorbent material(s) (e.g., silica, polymers) including surfaces modified with hydrophobic functional groups (e.g., straight-chain alkyl groups, such as methyl groups, 6-Methylheptyl groups, 3,4-diethyltetradecane groups). The hydrophobic functional groups may serve as sites for adsorption and desorption (e.g., thermal desorption, thermal stripping) of the organic liquid(s) within and across the TGO membrane 110 facilitated by progressively lower chemical potentials resulting from a thermal gradient established across the TGO membrane 110. The adsorbent material may, for example, comprise a material conventionally employed in liquid chromatography columns (e.g., high-performance liquid chromatography (HPLC) columns, such as reversed-phase HPLC (RP-HPLC) columns) to separate components of an organic solution from one another. The organic liquid(s) (e.g., organic liquid solvent) of the feed fluid stream 112 may remain in a liquid phase as the organic liquid(s) enter into, migrate across, and exit the TGO membrane 110 using TGO.

In some further embodiments wherein the feed fluid stream 112 comprises solution (e.g., a non-aqueous, inorganic solution) including one or more non-aqueous, inorganic liquid(s) (e.g., a non-aqueous, inorganic liquid solvent; at least one non-aqueous, inorganic liquid solute), the TGO membrane 110 is configured to facilitate the selective removal of the at least one non-aqueous, inorganic liquid (e.g., a non-aqueous, inorganic liquid solvent; at least one at least one non-aqueous, inorganic liquid solute) of the solution through TGO. In such embodiments, the TGO membrane 110 may be formed of and include material having affinity to the non-aqueous, inorganic liquid(s) and/or an aversion to other material(s) (e.g., other liquid(s), dissolved solid(s)) of the feed fluid stream 112. For example, the TGO membrane 110 may be formed of and include one or more material(s) including functional groups that serve as sites for adsorption and desorption (e.g., thermal desorption, thermal stripping) of the non-aqueous, inorganic liquid(s) within and across the TGO membrane 110 facilitated by progressively lower chemical potentials resulting from a thermal gradient established across the TGO membrane 110. The properties of the functional groups depend on the properties of the non-aqueous, inorganic liquid(s) to be selectively removed. In some embodiments, the TGO membrane 110 is formed of and includes one or more amphiphilic material(s). The non-aqueous, inorganic liquid(s) (e.g., non-aqueous, inorganic liquid solvent) of the feed fluid stream 112 may remain in a liquid phase as it enters into, migrates across, and exits the TGO membrane 110 using TGO.

In some still further embodiments wherein the feed fluid stream 112 comprises a solution (e.g., an aqueous solution; an organic solution; a non-aqueous, inorganic solution) including one or more liquid(s) (e.g., $H_2O$ liquid, organic liquid(s), non-aqueous, inorganic liquid(s) solute) and one or more dissolved material(s) (e.g., dissolved solid(s), such as organic dissolved solid(s) and/or inorganic dissolved solid(s); dissolved gas(es), such as, the organic dissolved gas(es) and/or inorganic dissolved gas(es)), the TGO membrane 110 is configured to facilitate the selective removal of at least one of the dissolved solid(s) of the solution through TGO. In such embodiments, the TGO membrane 110 may be formed of and include material having affinity to the dissolved material(s) to be removed and/or an aversion to other material(s) (e.g., liquid(s), other dissolved material(s)) of the feed fluid stream 112. For example, the TGO membrane 110 may be formed of and include one or more of at least one ion selective material and at least one material having functional groups (e.g., hydrophobic functional groups, hydrophilic functional groups) having affinity to the dissolved material(s) to be removed. The properties of the TGO membrane 110 depend on the properties of the dissolved material(s) to be selectively removed.

In some yet still further embodiments wherein the feed fluid stream 112 comprises a gaseous material (e.g., a gas mixture) including one or more (e.g., two or more) gas(es), the TGO membrane 110 is configured to facilitate the selective removal of at least one gas (e.g., one or more of $H_2O$ gas; at least one organic gas; and at least one non-aqueous, inorganic gas) of the gaseous material through TGO. In such embodiments, the TGO membrane 110 may be formed of and include material having affinity to the at least one gas sought to the removed, and/or an aversion to other materials (e.g., other gas(es), suspended liquid(s), suspended solid(s)) of the feed fluid stream 112. As a non-limiting example, if the feed fluid stream 112 comprises an aqueous gas and it is desired to separate (e.g., selectively draw) $H_2O$ gas of the feed fluid stream 112 from one or more other material(s) (e.g., other gas(es), suspended liquid(s), suspended solid(s)) of the feed fluid stream 112, the TGO membrane 110 may be formed of and include a material having affinity to the $H_2O$ gas, such as one or more hydrophilic material(s). As another non-limiting example, if the feed fluid stream 112 comprises at least one organic gas and it is desired to separate (e.g., selectively draw) the organic gas from one or more other material(s) (e.g., other gas(es), suspended liquid(s), suspended solid(s)) of the feed fluid stream 112, the TGO membrane 110 may be formed of and include a material having affinity to the organic gas, such as one or more hydrophobic material(s). As an additional non-limiting example, if the feed fluid stream 112 comprises at least one non-aqueous, inorganic gas and it is desired to separate (e.g., selectively draw) the non-aqueous, inorganic gas from one or more other material(s) (e.g., other gas(es), suspended liquid(s), suspended solid(s)) of the feed fluid stream 112, the TGO membrane 110 may be formed of and include a material having affinity to the non-aqueous, inorganic gas. In some embodiments, the TGO membrane 110 comprises a material conventionally employed in gas chromatography columns to separate components of a gas mixture. In additional embodiments, the TGO membrane 110 comprises a conventional gas diffusion membrane functionalized (e.g., with one or more functional group(s), such as hydrophilic functional groups and/or hydrophobic functional groups) based on the properties of the gas(es) desired to be selectively removed from the feed fluid stream 112. Functional groups of the TGO membrane 110 may serve as sites for adsorption and desorption (e.g., thermal stripping) of desired gas(es) of the feed fluid stream 112 within and across the TGO membrane 110 facilitated by progressively lower chemical potentials resulting from a thermal gradient established across the TGO membrane 110. The desired gas(es) of the feed fluid stream 112 may remain in a gaseous phase as the gas(es) enter into, migrate across, and exit the TGO membrane 110 using TGO.

With continued reference to FIG. 1, although the TGO apparatus 106 is depicted in FIG. 1 as including a single (i.e., only one) TGO membrane 110, the TGO apparatus 106 may include any quantity (e.g., number) of TGO membranes 110. Put another way, the TGO apparatus 106 may include a single (e.g., only one) TGO membrane 110, or may include multiple (e.g., more than one) TGO membranes 110. If the TGO apparatus 106 includes multiple TGO membranes 110, each of the TGO membranes 110 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates), or at least one of the TGO membranes 110 may be different (e.g., exhibit one or more of different components, different component sizes, different component shapes, different component material compositions, different component material distributions, different component positions, different component orientations) than at least one other of the TGO membranes 110 and/or may be operated under different conditions (e.g., different temperatures, different pressures, different flow rates, etc.) than at least one other of the TGO membranes 110. In some embodiments, two or more TGO membranes 110 are provided in parallel with one another within the housing structure 108 of the TGO apparatus 106. In additional embodiments, two or more TGO membranes 110 are provided in series with one another within the housing structure 108 of the TGO apparatus 106.

Optionally, the fluid treatment system 100 may include at least one membrane heating device 122 configured and operated to selectively heat of one or more portion(s) of the TGO membrane 110. The membrane heating device 122 may be provided on, over, and/or within (e.g., at least partially embedded therein) the TGO membrane 110 of the TGO apparatus 106. During use and operation, the membrane heating device 122 may enhance or facilitate a thermal gradient across the TGO membrane 110 to augment or effectuate selective mitigation of one or more material(s) of the feed fluid stream 112 through the TGO membrane 110 via TGO. For example, the membrane heating device 122 may configured and operated to make portions of the TGO membrane 110 relatively closer to the second region 138

(e.g., the region receiving the draw fluid stream 114) of the internal chamber 134 of the TGO apparatus 106 hotter than other portions of the TGO membrane 110 relatively closer to the first region 136 (e.g., the region receiving the feed fluid stream 112) of the internal chamber 134 of the TGO apparatus 106. If present, the membrane heating device 122 may be electrically coupled to and powered by the energy source 132.

As shown in FIG. 1, in some embodiments, the membrane heating device 122 includes at least one component 124 in physical contact with the TGO membrane 110. The at least one component 124 may, for example, be located on an external surface of the TGO membrane 110, and/or may be located within the TGO membrane 110. The component 124 may comprise one or more of at least one structure and at least one device facilitating selective heating of one or more portion(s) of the TGO membrane 110 proximate thereto during use and operation of the membrane heating device 122. In some embodiments, the component 124 comprises a solid state thermoelectric device, such as a Peltier device, configured and operated to use the thermoelectric effect (e.g., the Peltier effect) to heat one or more portion(s) of the TGO membrane 110 (e.g., portions proximate the second region 138 of the internal chamber of 112 of the TGO apparatus 106) and cool one or more other portions of the TGO membrane 110 (e.g., portions proximate the first region 136 of the internal chamber of 112 of the TGO apparatus 106). In additional embodiments, the component 124 comprises a heating element (e.g., a resistive heating element) configured and operated to use resistive heating (e.g., Joule heating, Ohmic heating) to heat one or more portion(s) of the TGO membrane 110 (e.g., portions proximate the second region 138 of the internal chamber of 112 of the TGO apparatus 106). In further embodiments, the component 124 is configured to adsorb one or more of electromagnetic radiation (e.g., one or more infrared radiation, microwave radiation, ultraviolet radiation, laser radiation, X-ray radiation) and ultrasonic energy that is directed to and interacts with one or more portion(s) of TGO membrane 110.

In additional embodiments, the membrane heating device 122 is free of (e.g., does not include) components in physical contact with the TGO membrane 110. The membrane heating device 122 may, for example, be configured and operated to produce one or more electromagnetic radiation (e.g., one or more infrared radiation, microwave radiation, ultraviolet radiation, laser radiation, X-ray radiation) and ultrasonic energy that is directed to and interacts with one or more portion(s) of TGO membrane 110 (e.g., portions proximate the second region 138 of the internal chamber of 112 of the TGO apparatus 106) to selectively heat the one or more portion(s) relative to one or more other portions of TGO membrane 110 (e.g., portion(s) proximate the first region 136 of the internal chamber of 112 of the TGO apparatus 106).

With continued reference to FIG. 1, optionally, the TGO apparatus 106 may further include a thermally reflective assembly 126 operatively associated with the TGO membrane 110 thereof. The thermally reflective assembly 126 may be configured and operated to assist with managing heat within the TGO apparatus 106. For example, the thermally reflective assembly 126 may be used to control heat loss through the TGO membrane 110, to circumvent thermal equilibrium between the opposing sides (e.g., the feed fluid stream side, and the draw fluid side) of the TGO membrane 110 and maintain a thermal gradient through the TGO membrane 110 during use and operation of the fluid treatment system 100. The thermally reflective assembly 126 may promote TGO using the TGO membrane 110 and may enhance the durability of the TGO membrane 110.

As shown in FIG. 1, if present, the thermally reflective assembly 126 includes at least one porous, thermally reflective structure 128 and, optionally, at least one thermally isolated structure 130. The thermally reflective assembly 126 may help maintain a desirable temperature of the draw fluid stream 114 within the second region 138 of the TGO apparatus 106 (e.g., relatively higher temperature as compared to a temperature of the feed fluid stream 112 within the first region 136 of the TGO apparatus 106), and limit heat loss to the first region 136 (e.g., the feed fluid region) of the TGO apparatus 106. For example, the porous, thermally reflective structure 128 may be located on (e.g., on a draw fluid side) and/or within (e.g., embedded within) the TGO membrane 110; and the thermally isolated structure 130 may be offset from the porous, thermally reflective structure 128 such that at least a portion of the draw fluid stream 114 received by the TGO apparatus 106 passes between the porous, thermally reflective structure 128 and the thermally isolated structure 130. As the draw fluid stream 114 flows through the TGO apparatus 106, some thermal energy (e.g., heat) of the draw fluid stream 114 may be reflected off the thermally reflective structure 128 and back into the draw fluid stream 114, while additional thermal energy of the draw fluid stream 114 may be transferred though the porous, thermally reflective structure 128 and to the TGO membrane 110 to establish or enhance a thermal gradient therein. In addition, some of the reflected thermal energy as well as additional thermal energy of the draw fluid stream 114 may be reflected off the thermally isolated structure 130 (if present) and back into the draw fluid stream 114.

The porous, thermally reflective structure 128 of the thermally reflective assembly 126 (if any) may be formed of and include at least one porous, thermally material compatible with the material compositions of the TGO membrane 110, the draw fluid stream 114, and the feed fluid stream 112. For example, the porous, thermally reflective structure 128 may be formed of and include discrete, thermally reflective particles; and at least one binder material (e.g., adhesive material) binding the discrete particles to the TGO membrane 110 and one another.

The discrete, thermally reflective particles may be formed at least one thermally reflective material (e.g., at least one thermally reflective pigment) able to reflect wavelengths of electromagnetic radiation within the infrared (IR) region of the electromagnetic spectrum, such as wavelengths of electromagnetic radiation with a range of from about 700 nanometers (nm) to about 2500 nm. The thermally reflective material may at least reflect wavelengths of electromagnetic radiation within the heat-producing portion of the IR region, such as wavelengths of electromagnetic radiation within a range of from about 700 nm to about 1100 nm. By way of non-limiting example, the thermally reflective material may comprise one of more of a metal oxide (e.g., titanium dioxide ($TiO_2$)) and a mixed metal oxide. In some embodiments, the thermally reflective material of at least some of the discrete, thermally reflective particles comprises $TiO_2$.

Optionally, the discrete, thermally reflective particles may be functionalized to exhibit desired affinities and/or aversions for different material(s) of the feed fluid stream 112. The affinities and/or aversions of the discrete, thermally reflective particles may promote the selective migration of one or more material(s) of the feed fluid stream 112 into the draw fluid stream 114 using TGO. For example, desirable functional groups (e.g., hydrophilic functional groups, hydrophobic functional groups, amphiphilic functional groups, organophilic functional groups, oxophilic functional groups, lipophilic functional groups, oleophilic functional groups) may be attached to the thermally reflective material(s) of the discrete, thermally reflective particles directly, and/or through intermediate functional groups (e.g., carboxy groups, amino groups, etc.) by way of one or more conventional reaction mechanisms (e.g., amination, nucleophilic substitution, oxidation, Stille coupling, Suzuki coupling, diazo coupling, organometallic coupling, etc.). In additional embodiments, the thermally reflective material(s) of the discrete, thermally reflective particles is/are formulated to exhibit desired affinities and/or aversions for different material(s) of the feed fluid stream 112 without having to perform additional processing acts to attach functional groups thereto. For example, the thermally reflective material(s) of the discrete, thermally reflective particles may already exhibit desired affinities and/or aversions for different material(s) of the feed fluid stream 112 without having to perform additional functionalization acts.

The discrete, thermally reflective particles may each individually have a particle size within a range of from about 0.25 micrometer (µm) to about 5 µm, such as within a range of from about 0.35 µm to about 1 µm, from about 0.35 µm to about 0.75 µm, or from about 0.35 µm to about 0.55 µm. The particle sizes of the discrete, thermally reflective particles may influence the wavelengths of electromagnetic radiation reflected by the porous, thermally reflective structure 128. In some embodiments, the discrete, thermally reflective particles have particle sizes promoting the reflection of electromagnetic radiation within the heat-producing portion of the IR region (e.g., electromagnetic radiation having a wavelength within a range of from about 700 nm to about 1100 nm), such as particle sizes within a range of from about 0.35 µm to about 0.55 µm. In addition, the discrete, thermally reflective particles may each individually exhibit a desired shape, such as one or more of a spherical shape, a hexahedral shape, an ellipsoidal shape, a cylindrical shape, a conical shape, and an irregular shape.

The discrete, thermally reflective particles may be monodisperse, wherein each of the discrete particles exhibits substantially the same material composition, substantially the same particle size, and substantially the same shape as each other of the discrete, thermally reflective particles; or may be polydisperse, wherein at least one of the discrete, thermally reflective particles exhibits one or more of a different material composition, a different particle size, and a different shape than at least one other of the discrete, thermally reflective particles. In some embodiments, the discrete, thermally reflective particles have a multi-modal (e.g., bi-modal, tri-modal, etc.) particle size distribution. For example, the discrete, thermally reflective particles may include a combination of relatively larger particles and relatively smaller particles. In additional embodiments, the discrete, thermally reflective particles have a mono-modal particle size distribution. For example, all of the discrete, thermally reflective particles may exhibit substantially the same particle size.

The binder material of the porous, thermally reflective structure 128 may comprise at least one material formulated to keep the discrete, thermally reflective particles adhered (e.g., bound, coupled) to the TGO membrane 110 and one another during use and operation of the fluid treatment system 100. The binder material may secure (e.g., physically anchor) the discrete, thermally reflective particles to the TGO membrane 110 and one another, while also maintaining desirable porosity characteristics in the TGO membrane 110 and the porous, thermally reflective structure 128 for selective migration of one or more materials of the feed fluid stream 112 therethrough and into the draw fluid stream 114 through TGO. Accordingly, the binder material of the porous, thermally reflective structure 128 may be selected at least partially based on the properties (e.g., material compositions) of the TGO membrane 110, the draw fluid stream 114, the feed fluid stream 112, and the discrete, thermally reflective particles of the porous, thermally reflective structure 128. In some embodiments, the binder material comprises one or more of at least one polymeric resin and at least one crosslinking material, such as one or more of an epoxy material, a phenolic material, an olefin coupling material, a melamine material, a silicone material, a ceramic paste material, and a disulfide coupling material.

If present, the thermally isolated structure 130 may comprise at least one structure (e.g., plate, foil, mesh) configured to reflect thermal energy of the draw fluid stream 114. The thermally isolated structure 130 may, for example, reflect thermal energy back into the draw fluid stream 114 and toward the porous, thermally reflective structure 128. The thermally isolated structure 130 may be formed of and include at least one material (e.g., relatively low thermal conductivity material) that remains in a solid state at temperature of the draw fluid stream 114, such as one or more of metal material (e.g., aluminum), a polymeric material, a ceramic material, and a composite material.

With continued reference to FIG. 1, although the fluid treatment system 100 is depicted in FIG. 1 as including a single (i.e., only one) TGO apparatus 106, the fluid treatment system 100 may include any quantity of TGO apparatuses 106. Put another way, the fluid treatment system 100 may include a single (e.g., only one) TGO apparatus 106, or may include multiple (e.g., more than one) TGO apparatuses 106. If the fluid treatment system 100 includes multiple TGO apparatuses 106, each of the TGO apparatuses 106 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the TGO apparatuses 106 may be different (e.g., exhibit one or more of different components, different component sizes, different component shapes, different component material compositions, different component material distributions, different component positions, different component orientations, etc.) than at least one other of the TGO apparatuses 106 and/or may be operated under different conditions (e.g., different temperatures, different pressures, different flow rates) than at least one other of the TGO apparatuses 106. By way of non-limiting example, one of the TGO apparatuses 106 may be configured for and operated under different temperature (e.g., different influent stream temperature) parameters than at least one other of the TGO apparatuses 106. In some embodiments, two of more TGO apparatuses 106 are provided in parallel with one another. Each of the two of more TGO apparatuses 106 may individually receive a feed fluid stream 112 and a draw fluid stream 114 and may individually form a product stream 116. In additional embodiments, two of more TGO apparatuses 106 are provided in series with one another. One of the two or more TGO apparatuses 106 may receive a feed fluid stream 112 and a draw fluid stream 114 and may form an initial product stream 116 therefrom, and another of the two or more TGO apparatuses 106 may receive the initial product stream 116 (e.g., as a substitute for the feed fluid stream 112) and another draw fluid stream 114 and may form another product stream 116 therefrom.

The feed fluid remnants stream 118 formed from and depleted in material(s) relative to the feed fluid stream 112 may exit the TGO apparatus 106 (e.g., the first region 136 of the internal chamber 134 of the TGO apparatus 106 and may be utilized or disposed of as desired. As shown in FIG. 1, in some embodiments, the feed fluid remnants stream 118 is directed into a containment vessel 140 for storage and/or further processing. The containment vessel 140 may comprise any structure, device, or apparatus configured and operated to at least temporarily hold material(s) of the feed fluid remnants stream 118. A single (e.g., only one) feed fluid remnants stream 118 may be directed from the TGO apparatus 106, or multiple (e.g., more than one) feed fluid remnants streams 118 may be directed from the TGO apparatus 106. If multiple feed fluid remnants streams 118 are directed from the TGO apparatus 106, each of the feed fluid remnants streams 118 may exhibit substantially the same properties (e.g., substantially the same material composition, substantially the same temperature, substantially the same pressure, substantially the same flow rate, etc.) as each other of the feed fluid remnants streams 118, or at least one of the feed fluid remnants streams 118 may exhibit one or more different properties (e.g., a different material composition, a different temperature, a different pressure, a different flow rate, etc.) than at least one other of the feed fluid remnants streams 118. In additional embodiments, at least a portion (e.g., all, less than all) of the feed fluid remnants stream 118 is directed (e.g., recycled) into one or more of the feed fluid source 102 and the feed fluid stream 112. The portion of the feed fluid remnants stream 118 may be directed (e.g., recycled) into the feed fluid source 102 and/or the feed fluid stream 112 before and/or after the feed fluid remnants stream 118 is directed into the containment vessel 140 (if any).

In addition, the product stream 116 formed from and enriched in material(s) relative to the draw fluid stream 114 may exit the TGO apparatus 106 (e.g., the second region 138 of the internal chamber 134 of the TGO apparatus 106) and may be utilized or disposed of as desired. As shown in FIG. 1, in some embodiments, the product stream 116 is directed into an additional apparatus 142 (e.g., an additional containment vessel, an additional separation device) for storage and/or further processing. The additional apparatus 142 may be configured and operated to at least temporarily hold material(s) of the product stream 116. A single (e.g., only one) product stream 116 may be directed from the TGO apparatus 106, or multiple (e.g., more than one) product streams 116 may be directed from the TGO apparatus 106. If multiple product streams 116 are directed from the TGO apparatus 106, each of the product streams 116 may exhibit substantially the same properties (e.g., substantially the same material composition, substantially the same temperature, substantially the same pressure, substantially the same flow rate, etc.) as each other of the product streams 116, or at least one of the product streams 116 may exhibit one or more different properties (e.g., a different material composition, a different temperature, a different pressure, a different flow rate, etc.) than at least one other of the product streams 116. As shown in FIG. 1, in some embodiments, at least a portion 144 of the product stream 116 is directed (e.g., recycled) into one or more of the draw fluid source 104 and the draw fluid stream 114 for use in repeating the process described above. Recycling the portion 144 of the product stream 116 may, for example, be employed to increase a concentration of the separated material(s) of the feed fluid stream 112 in additional volumes of the product stream 116 (upon completing one or more additional cycles of the process described above). The portion 144 of the product stream 116 may be directed (e.g., recycled) into the draw fluid source 104 and/or the draw fluid stream 114 before and/or after the product stream 116 is directed into the additional apparatus 142 (if any).

With continued reference to FIG. 1, thermal energy (e.g., heat) may be recovered (e.g., recycled) from one or more of the streams produced and/or utilized within the fluid treatment system 100. As a non-limiting example, heat may be transferred from one or more portion(s) of one or more of the product stream 116 and the feed fluid remnants stream 118 exiting the TGO apparatus 106 to one or more other stream(s) and/or apparatus(es) of fluid treatment system 100, such as additional portions of the draw fluid source 104, the draw fluid stream 114, and/or the housing structure 108 of the TGO apparatus 106 (e.g., portions of the housing structure 108 partially defining the second region 138 of the internal chamber 134 of the TGO apparatus 106). The portion(s) of the product stream 116 and the additional portions of the draw fluid stream 114 may, for example, be directed into at least one heat exchanger (e.g., the heating apparatus 120, another heating apparatus) to heat additional portions of the draw fluid stream 114 and cool the portion(s) of the one or more of the product stream 116 and the feed fluid remnants stream 118. The cooled portion(s) of the product stream 116 and/or the feed fluid remnants stream 118 may then be further utilized, processed, or disposed of, as desired.

The methods, systems (e.g., the fluid treatment system 100), and apparatuses (e.g., the TGO apparatus 106, including the TGO membrane 110 thereof) of the disclosure facilitate simple and efficient treatment of a feed fluid (e.g., the feed fluid stream 112) to selectivity separate one or more material(s) of the feed fluid from one or more other material(s) of the feed fluid. The methods, systems, and apparatuses of the disclosure reduce one or more of the time, costs, and energy (e.g., thermal energy, electrical energy, etc.) required to treat the feed fluid as compared to conventional methods, conventional systems, and conventional apparatuses. Accordingly, the methods, systems, and apparatuses of the disclosure may be more efficient (e.g., increasing material separation efficiency; reducing equipment, material, and/or energy requirements; etc.), durable, and reliable than conventional methods, conventional systems, and conventional apparatuses for treating a feed fluid to selectivity separate one or more material(s) of the feed fluid from one or more other material(s) of the feed fluid. The methods, systems, and apparatuses facilitate enhanced fluid treatment (e.g., material purification, material separation, material enrichment) for a wide variety of applications including, but not limited to, water purification applications, water softening applications, organic liquid purification applications, non-aqueous, inorganic liquid purification applications, solid material (e.g., dissolved solids) separation/enrichment applications, medical applications (e.g., kidney dialysis applications), biological applications, and nuclear material separation/enrichment applications.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of treating a fluid, comprising:
introducing a feed fluid stream comprising multiple materials to a first side of a semi-permeable membrane;
introducing a draw fluid stream having a higher temperature than a temperature of the feed fluid stream to a second, opposing side of the semi-permeable membrane to form a thermal gradient across the semi-permeable membrane;
increasing a temperature of one or more portions of the semi-permeable membrane proximate the second, opposing side of the semi-permeable membrane relative to one or more other portions of the semi-permeable membrane proximate the first side of the semi-permeable membrane by physically contacting the semi-permeable membrane with at least a portion of a membrane heating device; and
drawing one or more of the multiple materials of the feed fluid stream through the semi-permeable membrane and into the draw fluid stream via thermal gradient osmosis.

2. A method of treating a fluid, comprising:
introducing a feed fluid stream comprising multiple materials to a first side of a semi-permeable membrane, a second, opposing side of the semi-permeable membrane coated with a porous, thermally reflective material comprising discrete, thermally reflective particles and a binder material;
introducing a draw fluid stream having a higher temperature than a temperature of the feed fluid stream to the second, opposing side of the semi-permeable membrane to form a thermal gradient across the semi-permeable membrane; and
drawing one or more of the multiple materials of the feed fluid stream through the semi-permeable membrane and into the draw fluid stream via thermal gradient osmosis.

3. The method of claim 2, further comprising:
selecting the feed fluid stream to comprise an organic solution; and
selecting the semi-permeable membrane to comprise a hydrophobic material.

4. The method of claim 2, further comprising:
selecting the feed fluid stream to comprise a solution including a solvent and at least one solute; and
selecting the semi-permeable membrane to comprise at least one material exhibiting an affinity to the at least one solute.

5. The method of claim 2, further comprising:
selecting the feed fluid stream to comprise a gaseous material comprising two or more gases; and
selecting the semi-permeable membrane to comprise at least one material exhibiting an affinity to one of the two or more gases.

6. The method of claim 2, further comprising selecting the semi-permeable membrane to promote selective migration of the one or more of the multiple materials of the feed fluid stream through the semi-permeable membrane and into the draw fluid stream via one or more of physical interactions, electrostatic interactions, magnetic interactions, pressure, and chemical activity.

7. The method of claim 2, wherein introducing the feed fluid stream comprising multiple materials to the first side of the semi-permeable membrane comprises attaching at least one of a hydrophilic functional group, a hydrophobic functional group, an amphiphilic functional group, an organophilic functional group, an oxophilic functional group, a lipophilic functional group, or an oleophilic functional group to the semi-permeable membrane.

8. The method of claim 2, wherein introducing the feed fluid stream comprising multiple materials to the first side of the semi-permeable membrane comprises forming the semi-permeable membrane including at least one of a hydrophilic material, a hydrophobic material, an amphiphilic material, an organophilic material, an oxophilic material, a lipophilic material, or an oleophilic material.

9. The method of claim 2, wherein introducing the feed fluid stream comprising multiple materials to the first side of the semi-permeable membrane comprises forming the semi-permeable membrane from at least two different materials.

10. The method of claim 2, wherein introducing the feed fluid stream comprising multiple materials to the first side of the semi-permeable membrane comprises forming the semi-permeable membrane including a multi-layer structure.

11. The method of claim 10, wherein forming the semi-permeable membrane including the multi-layer structure comprises forming the semi-permeable membrane including the multi-layer structure comprising a hydrophilic support layer and a hydrophilic, two dimensional material.

12. A method of treating a fluid, comprising:
introducing a feed fluid stream comprising multiple materials to a first side of a semi-permeable membrane;
selecting the feed fluid stream to comprise an aqueous solution;
selecting the semi-permeable membrane to comprise a hydrophilic support layer and a hydrophilic selective layer on the hydrophilic support layer;
introducing a draw fluid stream having a higher temperature than a temperature of the feed fluid stream to a second, opposing side of the semi-permeable membrane to form a thermal gradient across the semi-permeable membrane;
positioning a thermally reflective assembly in communication with the draw fluid stream; and
drawing one or more of the multiple materials of the feed fluid stream through the semi-permeable membrane and into the draw fluid stream via thermal gradient osmosis.

13. The method of claim 12, further comprising heating an initial draw fluid stream using a heating apparatus upstream of the semi-permeable membrane to form the draw fluid stream.

14. The method of claim 13, further comprising employing one or more of solar thermal energy, wind energy, hydropower energy, geothermal energy, nuclear energy, fuel cell energy, combustion-based energy, waste heat, and recycled heat using the heating apparatus.

15. The method of claim 12, wherein drawing one or more of the multiple materials of the feed fluid stream through the semi-permeable membrane and into the draw fluid stream via thermal gradient osmosis comprises drawing dissolved solids of the feed fluid stream through the semi-permeable membrane and into the draw fluid stream via thermal gradient osmosis.

16. The method of claim 12, wherein positioning the thermally reflective assembly in communication with the draw fluid stream comprises positioning the thermally reflective assembly including at least one porous, thermally reflective structure in communication with the draw fluid stream.

17. The method of claim 12, wherein positioning the thermally reflective assembly in communication with the draw fluid stream comprises positioning the thermally reflective assembly including at least one thermally isolated structure in communication with the draw fluid stream.

18. The method of claim 17, wherein positioning the thermally reflective assembly including the at least one thermally isolated structure in communication with the draw fluid stream comprises positioning the thermally reflective assembly including the at least one thermally isolated structure in communication with the draw fluid stream to reflect thermal energy off of the thermally isolated structure back into the draw fluid stream.

19. The method of claim 12, further comprising forming the semi-permeable membrane of a two dimensional material having three or fewer monolayers bonded together through intramolecular forces.

\* \* \* \* \*